Aug. 4, 1964   A. R. NORDEN   3,143,310
FILM FEEDER
Filed April 11, 1961   6 Sheets-Sheet 1
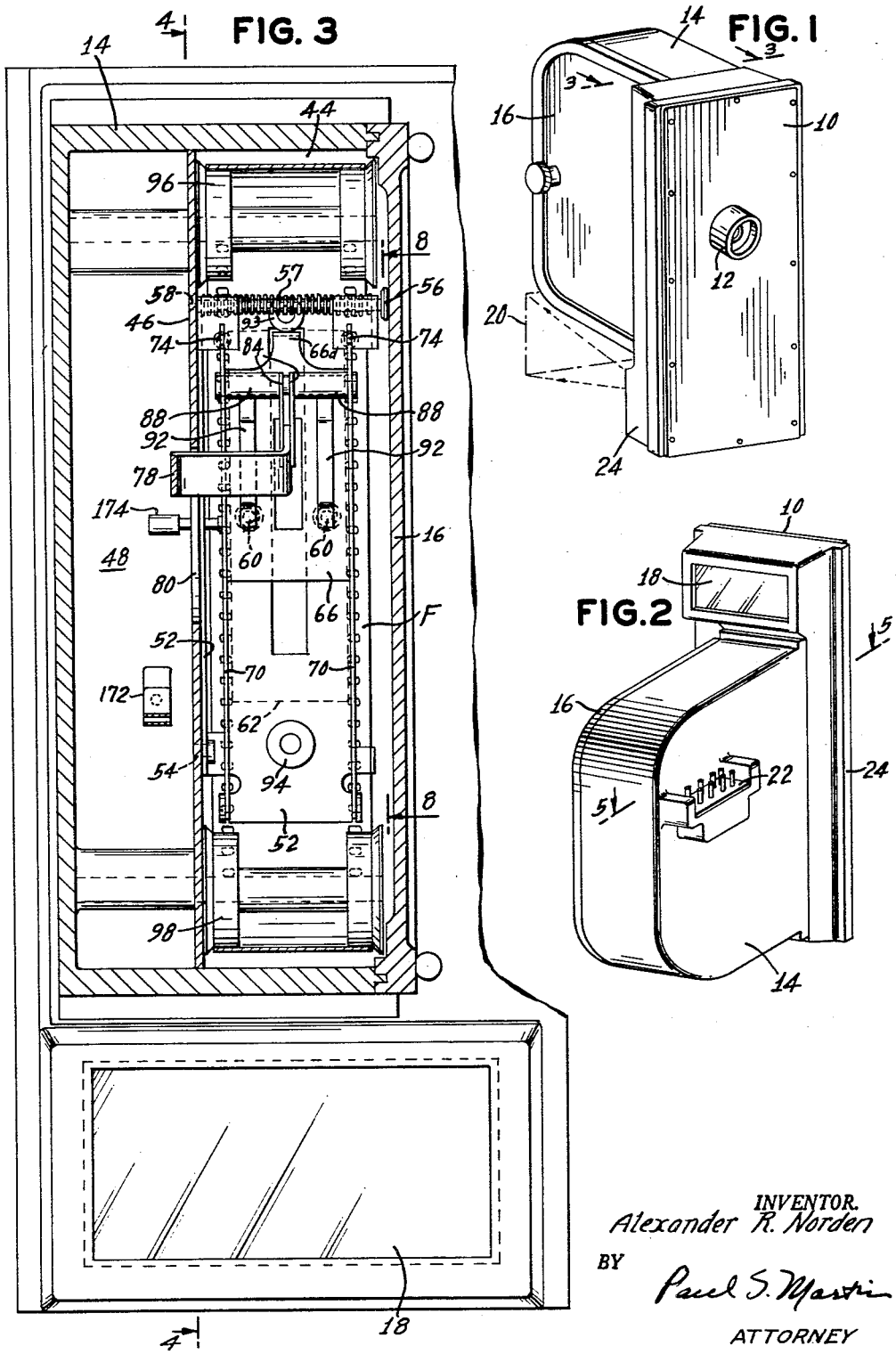
INVENTOR.
Alexander R. Norden
BY
Paul S. Martin
ATTORNEY

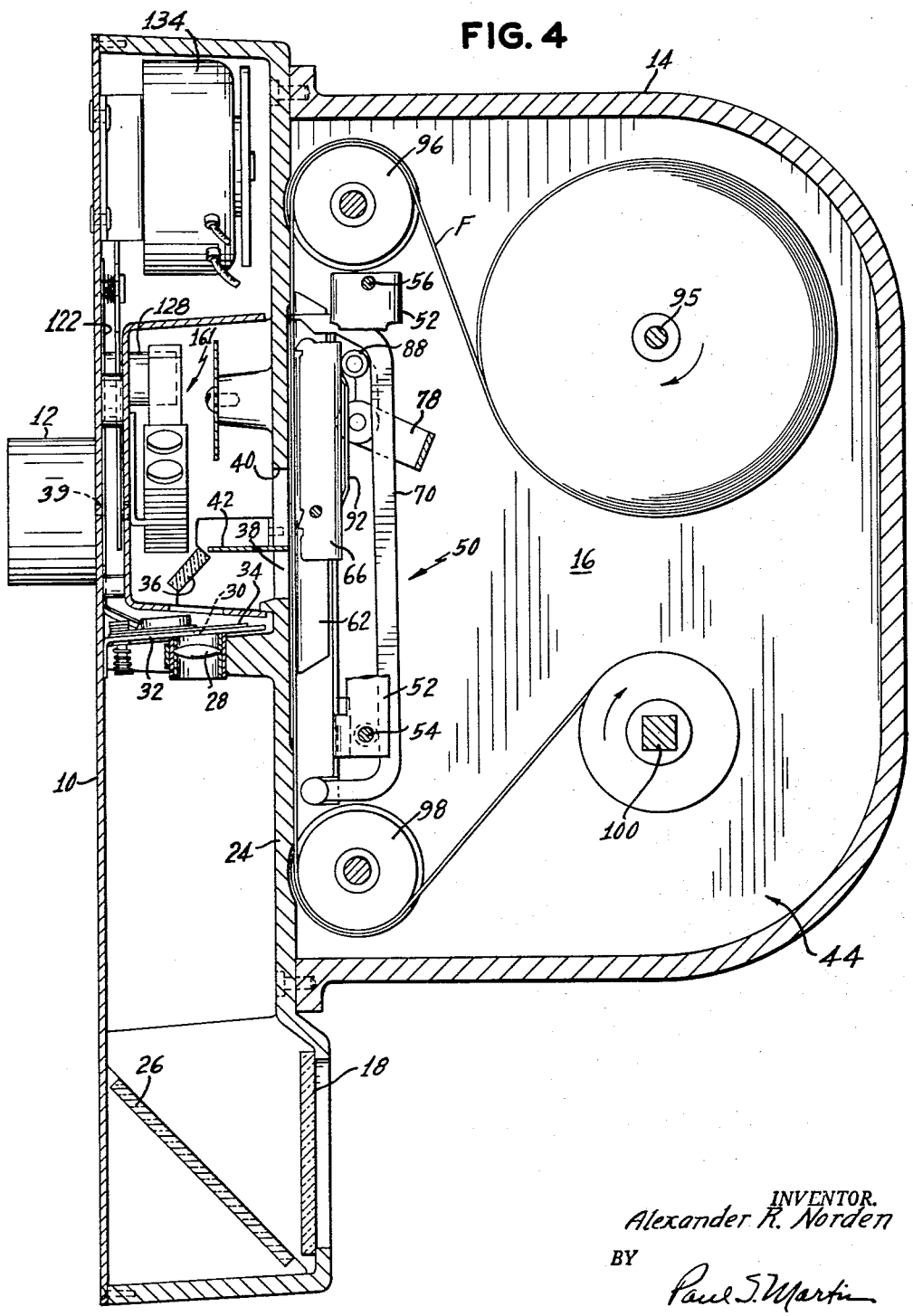

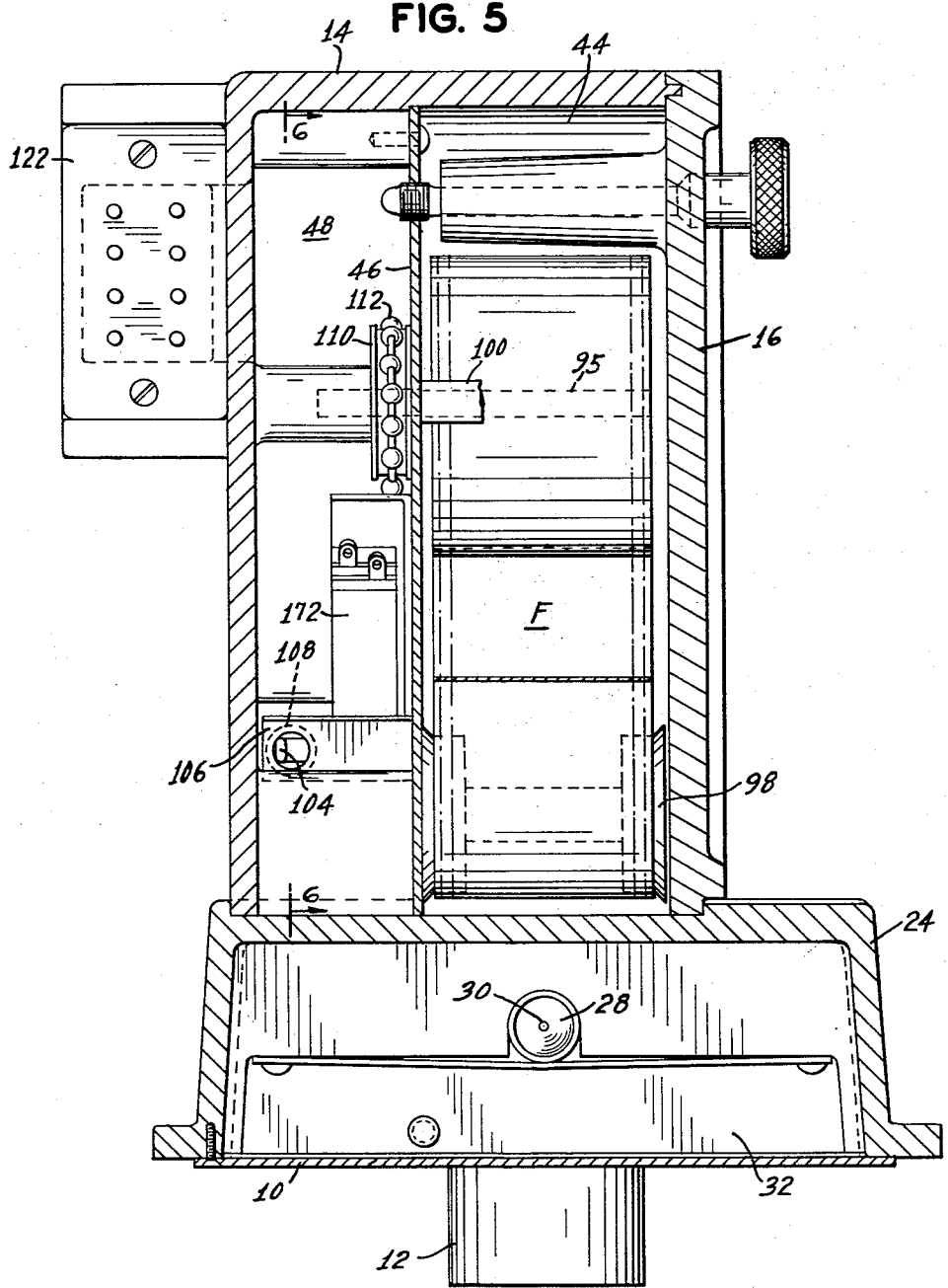

Aug. 4, 1964   A. R. NORDEN   3,143,310
FILM FEEDER
Filed April 11, 1961   6 Sheets-Sheet 4

INVENTOR,
Alexander R. Norden
BY
Paul S. Martin
ATTORNEY

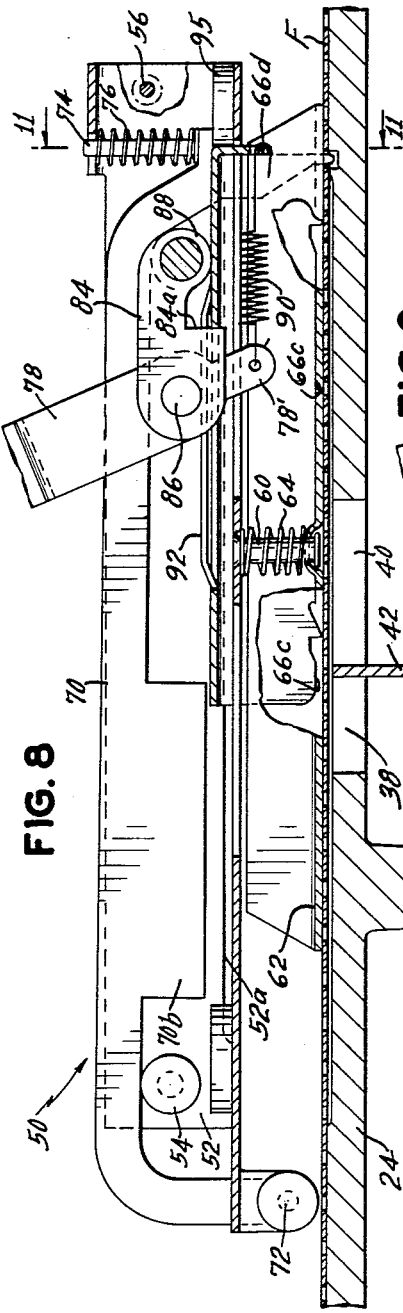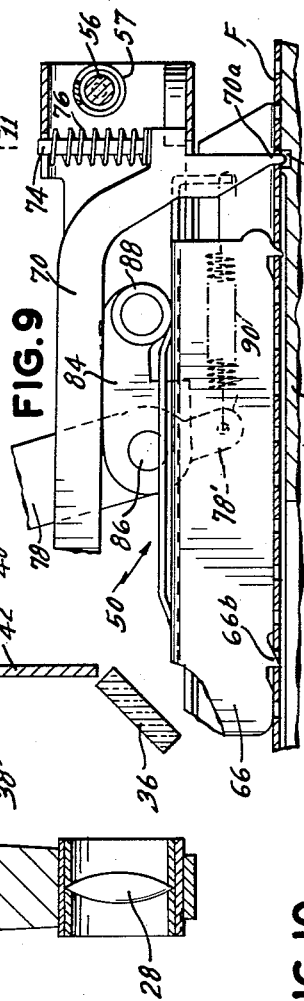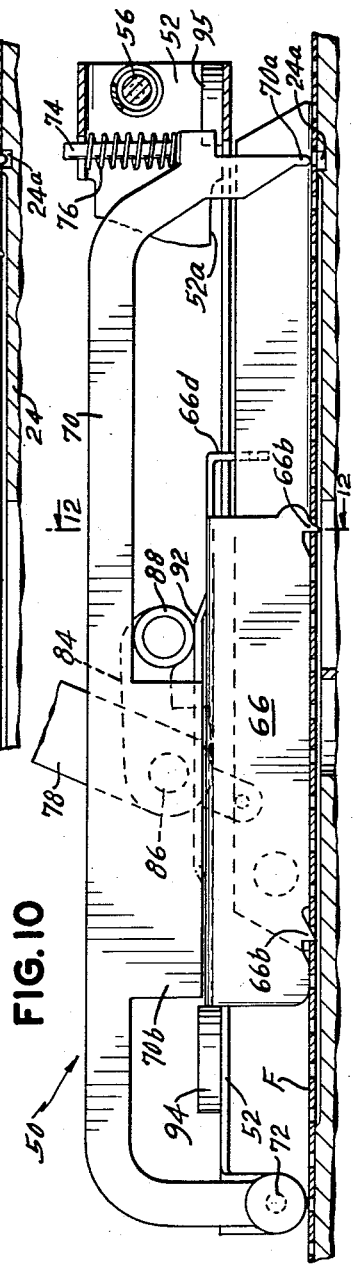

Aug. 4, 1964  A. R. NORDEN  3,143,310
FILM FEEDER
Filed April 11, 1961  6 Sheets-Sheet 6
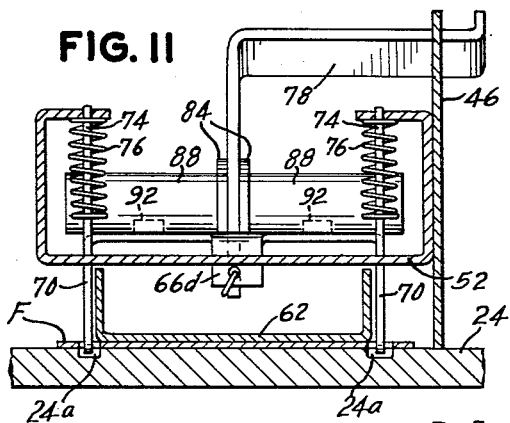
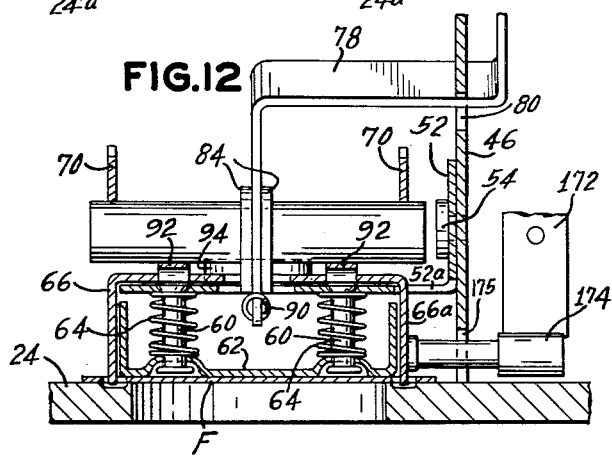
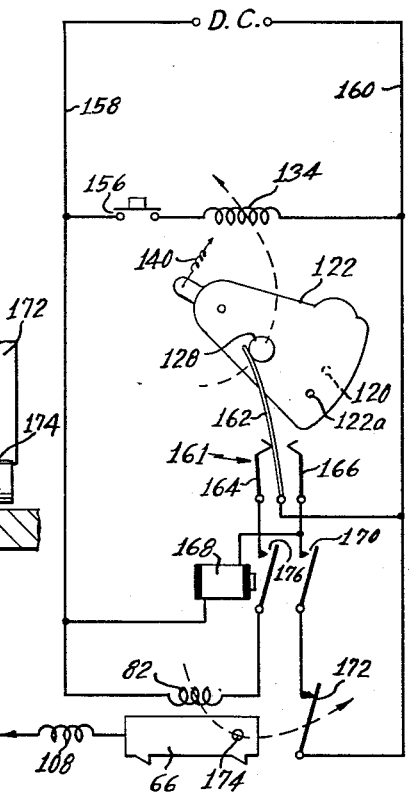
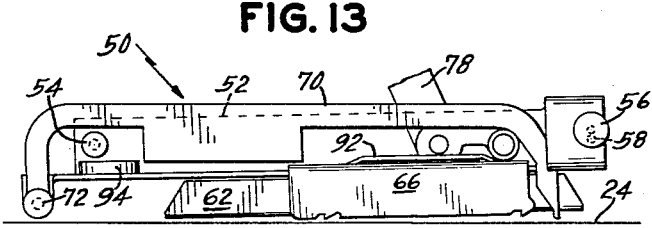
INVENTOR.
Alexander R. Norden
BY
Paul S. Martin
ATTORNEY United States Patent Office 3,143,310
Patented Aug. 4, 1964

3,143,310
FILM FEEDER
Alexander R. Norden, New York, N.Y., assignor to American Foto Patrol Inc., a corporation of New York
Filed Apr. 11, 1961, Ser. No. 102,225
6 Claims. (Cl. 242—55.11)

The present invention relates to apparatus for stepwise feeding of film or the like, and to take-up winding means for such apparatus.

An object of this invention resides in the provision of a novel step-by-step film advancing mechanism of a form suitable for operation by operating and spring-return strokes of an electromagnet. A related object of the invention resides in the coordination of take-up winding mechanism with step-by-step film-advancing mechanism, more particularly where such mechanisms are of respective forms adapted to be operated by forward and return strokes of an electromagnet. A further object of the invention resides in the provision of a novel take-up winding mechanism wherein invariable back-and-forth strokes of an actuator, particularly an electromagnet, may remain uniform and yet the resulting indexing or rotation of the take-up-roll shaft that is operated by the actuator may vary readily to wind equal one-step-advance lengths of film in each winding operation despite the wide variation in the diameter of the take-up roll during the winding of a long strip of film.

The illustrative film-feeding mechanism involves a stepwise film feeder that cooperates with sprocket holes in the film and advances the film a frame at a time past an exposure area. Alternating with the feeding strokes, a take-up mechanism drives the shaft of the take-up roll to wind the slack one-frame advanced length of film. The feeding mechanism in the illustrative embodiment involves a novel four-motion claw-and-detent mechanism, including a claw that advances the film in a feeding stroke and returns idly and a detent claw that arrests the film from the time the feed-stroke is complete to the time it is to start its next step advance. The mechanism includes a reciprocating or oscillating actuator that operates the feeding claw through a lost-motion resilient coupling, and the same actuator operates a mechanism that lifts a pair of detent claws out of film sprocket holes at the start of feed-claw advance and restores the detent claws at the start of the return stroke of the feed claw.

The novel take-up drive mechanism includes a bead-chain wrapped part-way about a sprocket fixed to the take-up shaft, a stiff-spring connection between one end of the chain and a reciprocating actuator, and a soft-spring tensioner connected to the opposite end of the bead-chain. As the actuator draws the stiff spring, the chain rotates the sprocket. The complete stroke of the actuator is ample to take up a full one-frame slack developed by the feed-claw mechanism, when the take-up roll is small. As the roll grows larger, it rotates less and less in taking up that one-frame length of slack. The chain, drawn by the actuator, is arrested when the slack is taken up, regardless of the diameter of the take-up roll. The stiff spring elongates thereafter, allowing the actuator to complete its stroke. During the return motion of the actuator, the spring elongation first disappears and then the actuator tends to push the stiff spring. This causes the beads of the chain to lift out of the sprocket pockets and a relatively weak spring at the other end of thte bead chain takes up the slack in the bead chain which "ratchets" around the sprocket in readiness for the next one-frame take-up of film slack.

The nature of the invention and various further objects, features and advantages will be more fully appreciated from the following detailed description of the illustrative embodiment thereof which is shown in the accompanying drawings forming part of this disclosure. In the drawings:

FIG. 1 is a reduced-scale front perspective view of an illustrative camera embodying the various features of the invention;

FIG. 2 is a reduced-scale inverted rear view of the camera of FIG. 1;

FIG. 3 is a vertical cross-section of the illustrative camera viewed from the plane 3—3 in FIG. 1;

FIG. 4 is a vertical cross-section viewed from the line 4—4 in FIG. 3;

FIG. 5 is a horizontal cross-section of the illustrative camera viewed from the plane 5—5 in FIG. 2;

FIG. 8 is a cross-section in the plane 8—8 of FIG. 3, drawn to greatly enlarged scale;

FIG. 9 is a view of a portion of the mechanism in FIG. 8 with the parts in their position assumed slightly after the start of a film-advancing stroke;

FIG. 10 is a view of the mechanism in FIG. 8 at the completion of the film-advancing stroke of that mechanism;

FIG. 11 is a fragmentary cross-section of the mechanism in FIG. 8, as viewed from the plane 11—11 in FIG. 8;

FIG. 12 is a fragmentary cross-section of the mechanism in FIG. 10, as viewed from the plane 12—12 of FIG. 10;

FIG. 13 is a view of the mechanism of FIG. 8, drawn to normal scale, with the parts lifted for facilitating threading of film; and FIG. 14 is a wiring diagram for operating and coordinating the various parts of the camera.

Figure 6:
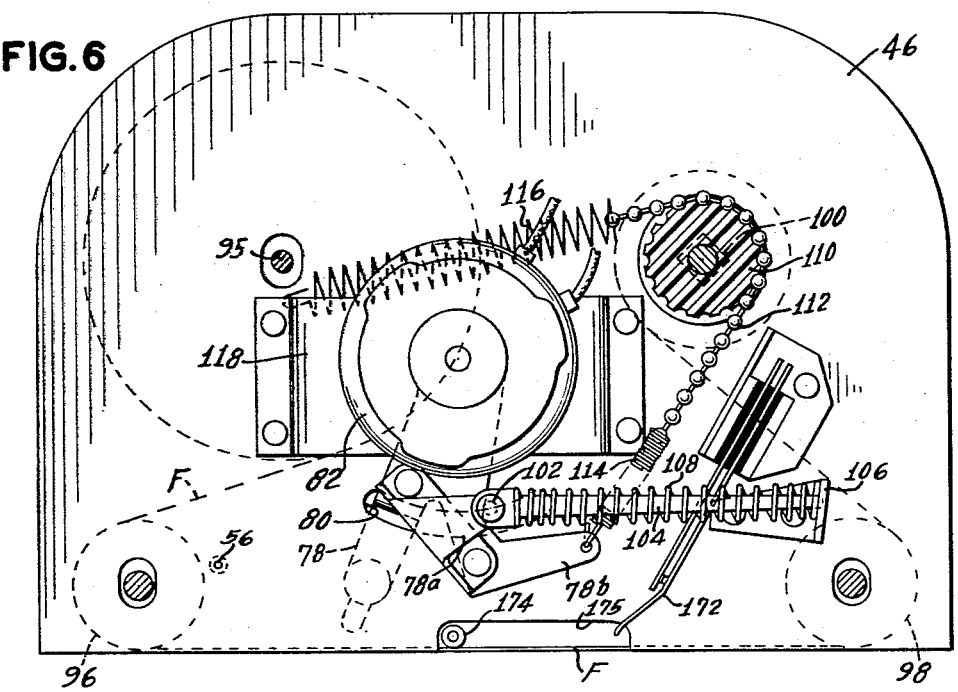
FIG. 6 is a rear view of a film-feed plate as viewed from the plane 6—6 in FIG. 5; the parts being shown in the normal positions they assume at the start of a cycle of operation, this being the end of a take-up winding operation.

Referring now to the drawings, the camera exterior involves a front plate 10 bearing a lens assembly 12 for photographing objects in front of the camera and normally at some distance away from the camera. Immediately behind front plate 10, and sealed in a light-tight front compartment, is a shutter mechanism. The rear section 14 of the camera contains the film-feeding mechanism and a film-chamber for supply and take-up rolls of film F. A removable side cover 16 affords access to the film-chamber for loading and unloading. At the bottom of the camera and facing to the rear is a window 18 which is directed toward an external data-display area 20 shown in broken lines in FIG. 1. At one side of the rear section 14 there is mounted a multi-pin connector 22 for making connection to the various electrical elements within the camera body. The camera body includes a dividing wall 24 which has side walls extending integrally to form a front compartment. The shutter mechanism and the optical systems are in front of this dividing wall and the film-feeding mechanism is behind this wall. The data image is admitted through window 18, and is reflected from front-surfaced mirror 26 to data lens 28. The data image passes through an aperture 30 in a wall 32 that is secured to front plate 10. The edges of wall 32 advantageously have soft gasketing material closing any edge-separation from front compartment wall 24 and the lateral side walls of the front compartment. Data shutter 34 normally blocks aperture 30, but when data shutter 34 moves away, the data image is reflected by front-surface mirror 36 through a data-image opening 38 to the film plane at the back surface of divider 24.

A "picture" is projected by lens assembly 12 through opening 39 in front-plate 10 and opening 40 in the wall 24 to reach a portion of the exposure area immediately adjacent to the data opening 38. Openings 38 and 40 are actually formed as a single frame, divided by a shield 42. Immediately behind lens assembly 12 is a dual shutter mechanism for normally closing openings 30 and 39. The details of this mechanism are more fully disclosed in a companion application filed concurrently herewith, entitled "Camera Shutters" filed by me jointly with Paul S. Martin, Ser. No. 102,266, filed April. 11, 1961.

Rear chamber 14 of the camera is divided into a film chamber 44 in front of a D-shaped plate 46 (see FIGS. 5, 6 and 7) and a mechanism chamber 48 behind plate 46. In addition to the film-feeding mechanism in chamber 48, there is a reciprocating feed-claw-and-detent mechanism in the film chamber 44, generally designated 50. Referring now to FIGS. 8–12, and particularly to FIGS. 8 and 12, the feed-claw mechanism 50 includes an elongated mounting bracket 52 that is generally L-shaped in cross-section and is secured to D-shaped plate 46 by a pivot 54. At its opposite end, mounting bracket 52 has an axially slidable pin 56 (see also FIG. 3) received in a hole 58 in plate 46. Compression spring 57, confined between the upstanding right-hand wall (FIG. 3) of bracket 52 and a shoulder (not shown) near the left-hand end of pin 56, biases that pin into its hole 58. A pair of headed rivets 60 project downward from bracket 52 and locate a pressure plate 62. Compression springs 64 about rivets 60 bias the pressure plate against the film F all around the picture and data opening 38, 40.

A feed claw 66 in the form of an elongated inverted channel is slidably mounted on bracket 52. The rear wall 66a moves in a slot 52a of this bracket. Each side wall of the channel-shaped feed claw 66 has a pair of teeth 66b, which project beyond the longitudinal edges 66c, respectively, to a limited extend. The edges 66c bear against the film surface. The teeth 66b extend nearly but not completely through the thickness of the film. Each tooth has a vertical side and a gradual sloping side, so that as the feed claw 66 is moved to the left in FIGS. 8–10, for example, it will carry the film with it, and as the feed claw 66 is moved in reverse, it will glide across the top surface of the film.

A pair of detent claws 70 have pivots 72 through downwardly extending ears of bracket 52 at the left-hand extremity of FIGS. 8 and 10. Ears 74 extend integrally upward from the right-hand ends of detent claws 70. Bracket 52 is formed as a guide for the detent claws and the upstanding ears 74, and compression springs 76 about ears 74 bias the detent claws towards the film. Each detent claw has a tooth 70a that penetrates through the film and enters a shallow cavity 24a in the wall 24 that forms the film guide.

A mechanism is incorporated in the feed-claw assembly 50 for initially lifting the detents 70 out of the film-sprocket holes, for driving the feed claw 66 through a measured stroke, for returning the detents 70 to sprocket holes, and for restoring the feed claw 66 to its initial position. This mechanism includes an oscillating drive arm 78 which extends through slot 80 in plate 46 and is operated in a power stroke by a rotary solenoid 82 (FIG. 6). Such rotary solenoids are of well-known construction, involving an axially movable core that operates a plate against three ball-bearings that move in respective short helical tracks when the solenoid is energized. A spring mechanism restores the armature and the plate in a return oscillatory stroke, as will be seen.

A pair of short arms 84 are connected by pivot 86 to crank arm 78. A dual roller 88 is secured to the right-hand extremity of arms 84 as viewed in FIGS. 8 to 10. A spring 90 is connected between a downward-projecting portion 78' of arm 78 and a hook 66d of the feed claw. Arms 78 and 84 are free to move from the position in FIG. 8 to that of FIG. 10 by virtue of clearance slots formed in bracket 52 and feed claw 66, as seen in FIGS. 8 and 12. A pair of camming rails 92 are struck up out of the feed claw 66 at opposite sides of the clearance slot in claw 66.

The operation of the feed-claw mechanism may now be described. With the parts as shown in FIG. 8, the feed cycle is in its at-rest condition, ready for a forward-feeding stroke. This is very quickly effected, by virtue of a power stroke of arm 78 from right to left as seen in FIGS. 8 to 10, as a result of energization of rotary solenoid 82 at the opposite side of plate 46. As arm 78 commences its leftward sweep, spring 90 draws feed claw 66 to the left until the four teeth 66b drop into respective sprocket-holes in the film. Because the film is arrested by detent claws 70 at this time, further operation of crank arm 78 to the left tends to stretch spring 90, and it carries dual roller 88 toward cam rails 92 (FIG. 9). As roller 88 climbs cam rails 92, the opposite ends of roller 88 work against the lower edges of detent claws 70 (FIG. 12) and lift the detent claws free of the film (FIG. 10). Continued operation of actuating arm 78 to the left drives the feed claw 66 with it, and transports the film which is no longer detained by the detent claw. The length of the feed stroke is limited by a bumper 94 fixed to bracket 52, bumper 94 being in the path of feed claw 66. Arm 78 over-travels to the left to some extent, but the length of the film advance is determined by stop 94. This stop is so positioned that the detent claws 70 have their teeth 70a directly above sprocket holes in the film.

As the return sweep of arm 78 commences, spring 90 holds feed claw 66 against stop 94. Roller 88 drops off the cam rails 92 and detent claws 70 drop into cooperation with the film sprocket holes to arrest the film. Further return motion of arm 78 (to the right as viewed in FIG. 10) causes positive drive of the feed claw 66 to the right by virtue of engagement of the shoulder portion 84a (FIG. 8) with the right-hand extremity of the slot in feed claw 66 in which elements 78 and 84 operate. Because part 84a strikes the right-hand top portion of claw 66 during the right-hand travel of arm 78, there is a tendency for the left-hand end of the claw 66 to lift. This lifting action facilitates the return travel of the feed claw, with its teeth 66b out of the sprocket holes of the film. Detent claws 70 have downward-extending portions 70b which are spaced only slightly above feed claw 66. Portions 70b therefore tend to prevent excessive bounce of the feed claw away from the film during the return motion, portions 70b being biased downward about pivot 72 by compression springs 76. Such springs act at a long lever arm away from the left-hand end of claw 66, and are firm enough to prevent the detent claws 70 from being lifted out of the film-arresting position. Feed-claw 66 is quickly transported to the right by arm 78, until both the claw and the arm are arrested by bumper 93, fixed to bracket 52.

Reviewing the operation of the step-by-step film advancing mechanism, it is clear that in the initial stage, actuating arm 78 operates feed claw 66 until feed 66b drop into sprocket-holes in the film F. Continued motion of the arm 78 stretches spring 90 until dual roller 88 rides up on cam rails 92 and lifts detent claws 70 out of engagement with the film. As soon as the film is freed in this way, feed claw 66 is effective to advance the film through a rapid advancing stroke, terminated by engagement of feed claw 66 with bumper 94. During the initial part of the return stroke of arm 78, roller 88 rides off cam rails 92 and allows detent claws 70 to reenter respective sprocket holes in the film (and thus claws 70 arrest the film before feed claw 66 starts to return). Thereafter, the feed claw 66 is mechanically driven to the right by the crank arm until the parts resume the initial position shown in FIG. 8.

As an aid in threading the film, bracket 52 is made movable. Bracket 52 pivots counter-clockwise about pivot 54 when pin 56 is pulled manually out of hole 58 (FIG. 3). Thereafter, by urging pin 56 counter-clockwise about pivot 54 as viewed in FIG. 13, the bracket 52 can be raised to a limited extent. This provides film-threading clearance between the feed claw assembly 50 and the film-guiding surface of wall 24. After threading is completed, the bracket 52 is swung clockwise (FIG. 13) until pin 56 again drops into hole 58. By adjusting the position of bumper 94, the length of a feed stroke can be varied over a range, provided only that in each adjustment the film is carried so that teeth 70a are opposite corresponding sprocket holes in the film at the end of the film-advancing stroke.

As seen in FIG. 4, film F from a supply roll on a fixed shaft 95 extends around a first idler 96, underneath the feed-claw assembly 50, around a second idler 98, and to a take-up roll on square shaft 100. The film and the feed-claw assembly in FIG. 4 are shown looking toward the removable cover 16, away from the feed plate 46 (FIG. 3). The mechanism behind plate 46 which operates shaft 100 and actuating arm 78 appears in FIGS. 6 and 7. Arm 78 is fixed to the rotary armature of the rotary solenoid and is impelled through an operating stroke of about 45 degrees in the mechanism represented in these two figures. When the solenoid is energized and has reached the limit of its operating stroke, arm 78 is in position shown in FIG. 7.

When the solenoid is deenergized, it should return to the position of FIG. 6. An extension 78a of arm 78 is connected by a pivot 102 to a rod 104 that works in a slotted guide plate 106. Compression spring 108 surrounds rod 104. In the initial configuration of the mechanism, spring 108 is only moderately compressed. When the rotary solenoid reaches the limit of its operating stroke, spring 108 is compressed to a maximum. However, pivot 102 moves toward the line between the guide portion of plate 106 and the axis of the rotary solenoid, so that only a portion of the increased force exerted by spring 108 is exerted in the solenoid-restoring direction, the other component of the spring force being directed toward the solenoid axis and being therefore ineffectual. This arrangement avoids an excessive variation in the level of spring-restoring bias, a bias which must be overcome by the solenoid in its energized operating stroke.

The film which is advanced by mechanism 50 as previously described is wound about a take-up reel keyed to shaft 100. A round portion of shaft 100 extends through a bearing in plate 46 and into a bearing in casting 14, and shaft 100 is mechanically united to a sprocket 110. This sprocket is advantageously of nylon and has a regular sequence of pockets complementary to the balls of a ball-chain 112 that is wrapped around a large part of the sprocket periphery. One end of the ball-chain is connected by a moderately stiff spring 114 to an extension arm 78b of solenoid-actuated arm 78. Spring 114 should be made so that its successive turns are biased against each other. The opposite end of the ball-chain is connected to a relatively soft spring 116, the other end of which is secured to a stationary bracket 118 on plate 46. This bracket 118 is actually a mounting plate for the rotary solenoid, and provides a working space for actuating arm 78.

In operation, when the feed mechanism is in condition for a feeding stroke as represented in FIG. 6, arm 78b has drawn relatively stiff spring 114 clockwise and drawn-ball-chain 112 into the position shown. Spring 116 is consequently stretched.

Figure 7:
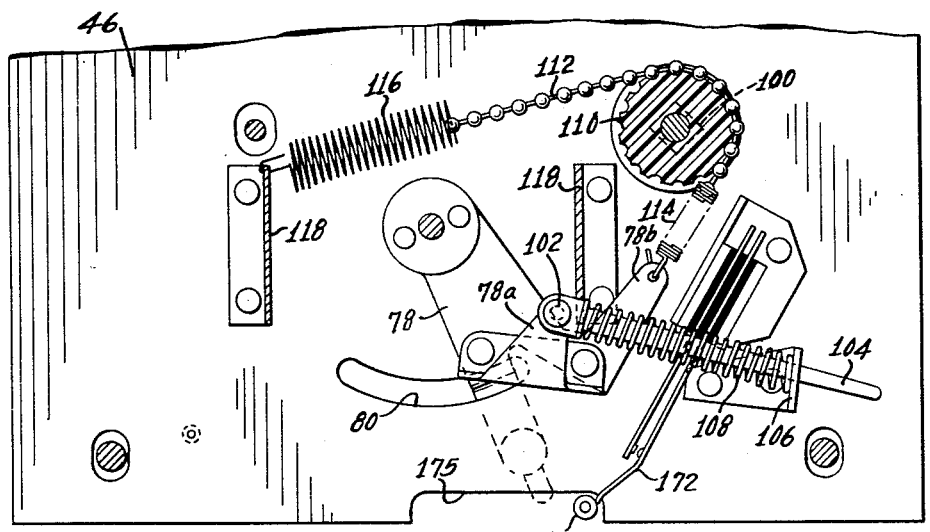
FIG. 7 is a view of the mechanism in FIG. 6 at the completion of a film-advancing stroke of the mechanism, preparatory to a take-up winding operation.

During the active feeding stroke of the feed-claw mechanism 50, arm 78 moves from left to right as viewed in FIGS. 6 and 7. Corresponding movement of extension arm 78b pushes "solid" spring 114 and allows slack to develop in ball-chain 112. This slack is taken up by spring 116 as fast as it develops. The balls of the chain "ratchet" in and out of the various pockets of the sprocket 110. At the conclusion of the power stroke of arm 78, there has been a one-frame advance of the film toward the take-up reel on shaft 100 and the detent claws 70 have again arrested the film. There is a definite slack in the film between detent claws 70 and shaft 100. Arm 78 then commences its return stroke from the position represented in FIG. 7 to that in FIG. 6. Arm 78 acts through spring 114 and exerts firm tension on ball-chain 112, and this causes clockwise rotation of shaft 100 as viewed in FIG. 7, thereby taking up the slack developed by the one-frame advance of the film. During this pulling stroke applied to chain 112, spring 116 biases the ball-chain into engagement with the various sockets of the sprocket 110. Spring 116 is extended in the course of this operating stroke.

It is not critical that the length of stroke of the ball-chain should equal that distance advanced by the film and, indeed, no such relationship could exist in view of the progressively increasing diameter of the take-up reel of film on shaft 100. When the take-up roll is small in diameter, the stroke traveled by ball-chain 112 is by design long enough to effect the desired take-up rotation. When the diameter of the take-up roll is considerably larger, the take-up operation is complete after only a fraction of the potential stroke of the ball-chain has been completed. Under such circumstances, the rotation of sprocket 110 is arrested by taut film when the film slack has been taken up, and thereafter the movement of extension arm 78b merely extends spring 114. In the next film-feeding sequence, as arm 78 moves counter-clockwise, the stretched spring 114 resumes its "solid" condition, after which chain 112 ratchets about sprocket 110.

The feeding mechanism as described thus includes a device 50 which advances the film one frame at a time and positively arrests the film-advance at the end of the film-advancing stroke and holds the film in place during the return motion of the feed-claw 66. The mechanism which operates the take-up reel becomes effective after the one-frame advance is complete, and the take-up mechanism winds the developed slack in the film regardless of the progressively increasing diameter of the take-up roll of film on the take-up shaft 100.

The dual spring and ball-chain assembly which co-operates with the sprocket is effective to produce resilient coupling between the actuating solenoid and the take-up reel; and it performs all of the functions of a combined ratchet-and-pawl mechanism and a slipping clutch. Experience has shown this to be remarkably durable and reliable.

FIG. 14 shows coordinating means for the shutter and the feed mechanism. Solenoid 134 that operates the shutter is shown connected in series with a push-button 156, for connecting the shutter solenoid 134 to the power lines 158 and 160. Nylon bumper 128 is fixed to shutter blade 122 and is disposed to actuate contact assembly 161 (FIG. 4). When the shutter is at rest, preparatory to exposure-making operations, bumper 128 maintains leaf spring contact 162 in engagement with companion contact 164 and out of engagement with contact 166.

Push-button 156 represents any remote-control contacts or, alternatively, it may be an actual push-button mounted on the camera. When this push-button switch is closed and shutter solenoid 134 is energized, shutter blade 122 is operated counter-clockwise against the tension of its restoring spring 140. Nylon bumper 128 releases spring contact 162 which breaks contact with companion normally-closed contact 164, and released contact 162 engages contact 166. This completes a circuit from line 160, through contacts 162 and 166, through the relay winding 168, to the opposite power line 158. Momentary energization of the relay by closure of contacts 162 and 166 establishes a holding circuit for the relay, including holding contacts 170 of the relay and normally closed contacts 172, to power line 160. Contacts 172 are opened by an insulated shaft 174 projecting rigidly from feed-claw 66. Shaft 174 opens contacts 172 when the feed-claw 66 nears the end of its forward film-feeding stroke.

So long as push-button 156 is held closed, shutter 122 is maintained in its forward position against the tension of its return spring 140; and during this time a prolonged exposure may be made. In any event, the switch-closed time of push-button 156 is not critical in relation to the sequence of shutter and film-feed operations.

At the end of the exposure time interval, push-button 156 is released. Upon deenergization of shutter solenoid 134, shutter blade 122 and nylon member 128 return to their normal, at-rest position shown in the drawing. This causes contacts 166 and 162 to open and restores the normal closed condition of contacts 162 and 164. When this occurs, a circuit is completed from line 160 through contacts 162 and 164 through a pair of relay contacts 176 to energize film-feed solenoid 82. This solenoid actuates the feed mechanism in a forward stroke. As feed-claw 66 nears the end of its forward stroke, insulated shaft 174 opens contacts 172 and in this way interrupts the holding circuit of relay 168. When the relay is deenergized, its control contacts 176 open. The feed solenoid 82 is deenergized so that the feed mechanism is spring-restored to its starting configuration.

The foregoing circuit coordinates the shutter and the film-feeding mechanism. The operation of the film-feeder is quite fast, so that the whole camera cycle can be repeated at short intervals. The film feeder disclosed requires only a relatively small rotary solenoid for carrying out the entire feeding and slack take-up functions.

The various features of novelty in the foregoing film-handling apparatus will be recognized as being separately useful, and useful in other combinations; and the disclosed apparatus is subject to modification by those skilled in the art within the novel concepts disclosed. Consequently, the invention should be broadly construed in a manner consistent with its full spirit and scope.

What is claimed is:

1. Film-feeding mechanism, including a reciprocable actuator having an electromagnet operable to effect forward strokes of the actuator and having a spring to effect return strokes of the actuator, a positive-acting film advancing mechanism operable by said actuator during each forward stroke thereof to advance a single-frame length of film and said mechanism having a detent and operating means therefor effective to arrest said film between successive forward strokes and to release said film during forward strokes, and a take-up mechanism including a shaft for a take-up roll and a one-way drive for said shaft having a resilient coupling to said actuator, said one-way drive being arranged to drive said shaft during the return strokes of said actuator.

2. A film-handling mechanism, including a reciprocable actuator, a shaft having a sprocket, a length of bead chain extending about a substantial peripheral part of the sprocket, first spring means connected to one end of said bead chain and to a reaction point, second spring means connected between said actuator and the other end of said bead chain and said second spring means acting when being pushed by said actuator to release said bead chain from said sprocket so that the chain ratchets free of the sprocket under tension of said first spring means, said second spring means biasing said bead chain against said sprocket and driving said sprocket during the reverse strokes of said actuator.

3. A strip-advancing mechanism, including a rotary solenoid having an arm operable through a predetermined angle, a spring having a connection to a reaction point and a second connection to said arm and said second connection being movable between a point close to the straight line between said reaction point and the axis of said rotary solenoid and a point more remote from said line, and film advancing means operable by said spring.

4. A strip-advancing mechanism, including a rotary solenoid having an arm operable through a predetermined angle, a spring having a connection to a reaction point and a second connection to said arm and said second connection being movable between a point close to the straight line between said reaction point and the axis of said rotary solenoid and a point more remote from said line, and a winding mechanism and a step-by-step strip feeder connected to and operated alternately by said arm during respective operating strokes of said solenoid and of said spring.

5. A strip-advancing mechanism, including a rotary solenoid having an arm operable through a predetermined angle, a spring having a connection to a reaction point and a second connection to said arm and said second connection being movable between a point close to the straight line between said reaction point and the axis of said rotary solenoid and a point more remote from said line, a four-motion feeder operable by said arm including a film-feeding means and film-arresting means alternately rendered effective by said arm to advance the film a certain extent and then to lock the film at a point, a take-up mechanism including a reel-driving shaft operable to wind up the film slack when said film arresting means is in effect and to relax winding effort during the active operation of said film-feeding means.

6. A mechanism for advancing perforated film a frame at a time, including a detent claw, a feed claw, a reciprocable actuator having one-way spring coupling to said feed claw and having an element interposed between said detent claw and said feed claw, spring means biasing said detent claw toward the film and against said interposed element and thereby biasing said element against said feed claw, said feed claw having a cam in the path of said element when moved by said actuator in the direction to cause said feed claw to advance the film, said cam thereby being effective to lift said detent claw away from the film and thereby free the film for advance by the feed claw.

References Cited in the file of this patent

UNITED STATES PATENTS

| | | |
|---|---|---|
| 1,560,908 | Garbutt et al. | Nov. 10, 1925 |
| 2,806,694 | Penman | Sept. 17, 1957 |